United States Patent
Jiang et al.

(10) Patent No.: US 11,804,037 B1
(45) Date of Patent: Oct. 31, 2023

(54) METHOD AND SYSTEM FOR GENERATING IMAGE SAMPLE HAVING SPECIFIC FEATURE

(71) Applicant: CONTEMPORARY AMPEREX TECHNOLOGY CO., LIMITED, Ningde (CN)

(72) Inventors: Guannan Jiang, Ningde (CN); Jv Huang, Ningde (CN); Chao Yuan, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/332,289

(22) Filed: Jun. 9, 2023

Related U.S. Application Data (63) Continuation of application No. PCT/CN2021/135284, filed on Dec. 3, 2021.

(51) Int. Cl.
| | |
|---|---|
| G06K 9/00 | (2022.01) |
| G06V 10/82 | (2022.01) |
| G06T 5/00 | (2006.01) |
| G06T 7/00 | (2017.01) |
| G06V 10/771 | (2022.01) |
| G06V 20/70 | (2022.01) |
| G06T 7/12 | (2017.01) |

(52) U.S. Cl.
CPC ............ *G06V 10/82* (2022.01); *G06T 5/002* (2013.01); *G06T 7/0008* (2013.01); *G06T 7/12* (2017.01); *G06V 10/771* (2022.01); *G06V 20/70* (2022.01); *G06T 2207/20081* (2013.01); *G06T 2207/20132* (2013.01)

(58) Field of Classification Search
CPC ...... G06V 10/82; G06V 20/70; G06V 10/771; G06T 7/12; G06T 5/002; G06T 7/0008; G06T 2207/20081; G06T 2207/20132
USPC ....................................................... 382/157
See application file for complete search history.

(56) References Cited

FOREIGN PATENT DOCUMENTS

| CN | 109815928 A | 5/2019 |
|---|---|---|
| CN | 110322433 A | 10/2019 |
| CN | 110930470 A | 3/2020 |

(Continued)

OTHER PUBLICATIONS

Sushko, Vadim, et al. "You only need adversarial supervision for semantic image synthesis." arXiv preprint arXiv:2012.04781 (2020). (Year: 2020).*

(Continued)

*Primary Examiner* — Jonathan S Lee
(74) *Attorney, Agent, or Firm* — Ladas & Parry LLP (57) ABSTRACT

The present application provides a method and a system for generating an image sample having a specific feature. The method includes: training a generative adversarial network-based sample generation model, where the generative adversarial network includes a generator and two discriminators: a global discriminator configured to perform global discrimination on an image, and a local discriminator configured to perform local discrimination on a specific feature; and inputting, to a trained generator that serves as a sample generation model, a semantic segmentation image that indicates a location of the specific feature and a corresponding real image not having the specific feature, to obtain a generated image sample having the specific feature.

13 Claims, 5 Drawing Sheets

(56) References Cited

FOREIGN PATENT DOCUMENTS

| CN | 111833359 A | 10/2020 |
|---|---|---|
| WO | 2021017372 A1 | 2/2021 |

OTHER PUBLICATIONS

Wang, Min, et al. "Fine-grained semantic image synthesis with object-attention generative adversarial network." ACM Transactions on Intelligent Systems and Technology (TIST) 12.5 (2021): 1-18. (Year: 2021).*

Fontanel, Dario, et al. "Detecting anomalies in semantic segmentation with prototypes." Proceedings of the IEEE/CVF Conference on Computer Vision and Pattern Recognition. 2021. (Year: 2021).*

International Search Report dated Aug. 30, 2022 for Application No. PCTCN2021135284.

Written Opinion dated Aug. 30, 2022 for Application No. PCTCN2021135284.

Meng, Qi et al., "Data Enhancement of Lens Defect Based on Dual Channel Generative Adversarial Networks", Laser & Optoelectronics Progress, vol. 58, No. 20, Oct. 31, 2021, pp. 2015001-1-2015001-9.

Zhao, Xiao et al., "Double-cycle Consistent Insulator Defect Sample Generation Method Based on Local Fine-grained Information Guidance", Computer Science), vol. 48, No. 6A, Jun. 30, 2021, pp. 581-586, 602.

\* cited by examiner

METHOD AND SYSTEM FOR GENERATING IMAGE SAMPLE HAVING SPECIFIC FEATURE

CROSS-REFERENCE TO RELATED APPLICATION

This application is a continuation of International application PCT/CN2021/135284 filed on Dec. 3, 2021. This application is incorporated herein by reference in its entirety.

TECHNICAL FIELD

The present application relates to the field of artificial intelligence, and in particular, to a method and a system for generating an image sample having a specific feature.

BACKGROUND ART

With the development of artificial intelligence technologies, artificial intelligence is increasingly applied to various scenarios. In the field of image recognition, many technologies that use artificial intelligence to improve the accuracy of image recognition have been developed.

In such artificial intelligence-based image recognition technologies, usually, an image recognition model is first trained based on a training data set, and then an image to be recognized is input to a trained model, and the model outputs a recognition result. A training process of the model is time-consuming, and a recognition accuracy rate of the model quite depends on accuracy and an amount of training data. However, it may be difficult to obtain a sufficient amount of accurate training data. For example, to train a model for recognizing a specific feature included in an image, a large number of image samples having the specific feature are required. However, when a natural occurrence probability of the specific feature is quite low, it is difficult to acquire a real image having such a specific feature.

SUMMARY OF THE INVENTION

In view of the above problems, the present application provides a method and a system for generating an image sample having a specific feature, to properly increase a number of samples when there are only a quite small number of such samples, so as to quickly acquire a sufficient number of required samples.

According to a first aspect, the present application provides a method for training a sample generation model for generating an image sample having a specific feature. The method includes: obtaining a training data set, where the training data set includes a plurality of real images having a specific feature, a corresponding semantic segmentation image, and a plurality of real images not having the specific feature, and the semantic segmentation image is a binary image for distinguishing the specific feature from another object; constructing a generative adversarial network, where a generator of the generative adversarial network is configured to generate a generative image having the specific feature based on the input semantic segmentation image and a corresponding real image not having the specific feature, where the semantic segmentation image is used as a priori information about a location of the specific feature; and a discriminator of the generative adversarial network further includes a global discriminator and a local discriminator, where the global discriminator is configured to discriminate authenticity of an input image, and the local discriminator is configured to discriminate authenticity of an input local image having the specific feature; and performing adversarial training on the generative adversarial network to optimize an ability of the generator to generate a generative image having the specific feature based on a real image not having the specific feature, where the trained generator is used as the sample generation model.

Through this method for training a sample generation model, an image sample generation model capable of generating a specific feature at a specified location in a real image can be obtained through training. Compared with a conventional generative adversarial network, the present application introduces information about a location of a specific feature as a priori information. This can effectively reduce an amount of computation during training of the generator and the discriminator of the generative adversarial network, and improve a discrimination accuracy rate and generation fidelity. In addition, an additional local discriminator is added, so that a generated feature can remain realistic in local zoom-in, and details of the generated feature can be better restored.

In some embodiments, the generator uses a SPADE-based generator structure, and the generator is configured to: use, as an input, data that includes the semantic segmentation image and an image obtained after erasing, from a corresponding real image, information about a specific feature region indicated in the semantic segmentation image, where the image obtained after erasing the information is input to a backbone network of an encoder-decoder structure, and the semantic segmentation image is input, as a semantic mask, to a SPADE branch to be introduced into a decoder part of the backbone network. The backbone network uses the image obtained after erasing the information as random noise to generate a feature map of the specific feature region indicated in the semantic segmentation image, performs blending, based on the semantic segmentation image, on the generated feature map and the image obtained after erasing the information, and uses a blended image as the generated generative image having the specific feature. By using this SPADE-based generator structure, the generator can generate an image of a defect at a specified location in the semantic segmentation image based on a feature of an input real image of a sealing pin region. The generated defect appears to have a feature of a surrounding region, and blending with the surrounding region is quite natural and realistic. In addition, in a final output picture, only the defect region is generated, so that a remaining part is completely free of distortion. In addition, computation processes can be reduced during encoding and decoding of the generator. For example, compared with a whole image, only an image of a quite small defect region needs to be generated.

In some embodiments, the performing adversarial training on the generative adversarial network includes: separately labeling the real image and the generative image having the specific feature that is generated by the generator, and providing the images together with a corresponding semantic segmentation image to the global discriminator for training; and cutting, based on the semantic segmentation image, a local real image and a local generative image that have a specific feature part respectively from the labeled real image provided to the global discriminator and the generative image having the specific feature hat is generated by the generator, and providing, to the local discriminator for training, the local real image and the local generative image together with a local semantic segmentation image having the specific feature part that is cut from the semantic segmentation image. A local image is cut from a global image for use by the local discriminator, without increasing a burden of additional training sample data. Likewise, the semantic segmentation image only needs to be cut correspondingly without additional preparation.

In some embodiments, data used for training the discriminator includes: a training data pair that includes a labeled real image having the specific feature and a corresponding real semantic segmentation image, a training data pair that includes a labeled real image not having the specific feature and a semantic segmentation image selected from the real semantic segmentation image, and a training data pair that includes a labeled real image not having the specific feature and a randomly generated semantic segmentation image. In this manner, a same discriminator algorithm and program can be applied to a picture not having a defect and a picture having the defect, and a burden of a requirement for a number of training samples is also reduced.

In some embodiments, the performing adversarial training on the generative adversarial network includes: training the global discriminator and the local discriminator in parallel. By integrating global and local discrimination results, the discriminator has a stronger discrimination ability than a conventional discriminator, so that a generation effect of the generator is further improved. Particularly, a local image generation ability with respect to a defect location is significantly improved.

In some embodiments, the specific feature is a welding defect of a sealing pin. The method for training a sample generation model in the present application is used to train a model for generating a sealing pin welding defective sample, thereby effectively solving a problem that a number of real defective samples is small.

According to a second aspect, the present application provides a method for generating an image sample having a specific feature. The method includes: obtaining a real image not having a specific feature; constructing a semantic segmentation image that indicates a location of a region in which the specific feature is expected to be generated, where the semantic segmentation image is a binary image for distinguishing the specific feature from another object; erasing information, in the real image not having the specific feature, that corresponds to the region having the specific feature in the constructed semantic segmentation image; and inputting an image obtained after erasing the information, together with the semantic segmentation image, to a sample generation model trained according to a model training method provided in the present application, to obtain an image sample having the specific feature.

Through this method, a defect can be generated, according to a requirement, at a specified location in a real image not having the defect, to form an image having the defect as a sealing pin welding defective sample, so that a large number of image samples available for training can be conveniently obtained.

In some embodiments, the constructing a semantic segmentation image that indicates a location of a region in which the specific feature is expected to be generated includes: selecting one semantic segmentation image from a plurality of real semantic segmentation images corresponding to a plurality of real images having the specific feature; or specifying one or more expected locations for the specific feature on a plurality of real images not having the specific feature, and generating a corresponding semantic segmentation image based on the specified one or more expected locations for the specific feature. A semantic segmentation image of a real defective image is directly used, or an expected location of a defect is directly specified, for example, a location on a sealing pin weld bead is specified, so that a generated image sample having the defect can be closer to a real defective image.

In some embodiments, the specific feature is a welding defect of a sealing pin. The method for generating an image sample having a specific feature in the present application is used to generate a sealing pin welding region image having a defect, thereby effectively solving a problem that a number of real sealing pin welding defective samples is small.

According to a third aspect, the present application provides a system for training a sample generation model for generating an image sample having a specific feature. The system includes: a training data acquisition module configured to obtain a training data set, where the training data set includes a plurality of real images having a specific feature, a corresponding semantic segmentation image, and a plurality of real images not having the specific feature, and the semantic segmentation image is a binary image for distinguishing the specific feature from another object; and a model training module configured to: construct a generative adversarial network, where a generator of the generative adversarial network is configured to generate a generative image having the specific feature based on the input semantic segmentation image and a corresponding real image not having the specific feature, where the semantic segmentation image is used as a priori information about a location of the specific feature; and a discriminator of the generative adversarial network further includes a global discriminator and a local discriminator, where the global discriminator is configured to discriminate authenticity of an input image, and the local discriminator is configured to discriminate authenticity of an input local image having the specific feature; and perform adversarial training on the generative adversarial network to optimize an ability of the generator to generate a generative image having the specific feature based on a real image not having the specific feature, where the trained generator is used as the sample generation model. Through the system for training a sample generation model for generating an image sample having a specific feature in the present application, an image sample generation model capable of generating a specific feature at a specified location in a real image can be obtained through training, so that a large number of training samples required can be quickly generated.

In some embodiments, the generator uses a SPADE-based generator structure, and the generator is configured to: use, as an input, data that includes the semantic segmentation image and an image obtained after erasing, from a corresponding real image, information about a specific feature region indicated in the semantic segmentation image, where the image obtained after erasing the information is input to a backbone network of an encoder-decoder structure, and the semantic segmentation image is input, as a semantic mask, to a SPADE branch to be introduced into a decoder part of the backbone network. The backbone network uses the image obtained after erasing the information as random noise to generate a feature map of the specific feature region indicated in the semantic segmentation image, performs blending, based on the semantic segmentation image, on the generated feature map and the image obtained after erasing the information, and uses a blended image as the generated generative image having the specific feature. By using this SPADE-based generator structure, the generator can generate an image of a defect at a specified location in the semantic segmentation image based on a feature of an input real image of a sealing pin region. The generated defect appears to have a feature of a surrounding region, and blending with the surrounding region is quite natural and realistic. In addition, in a final output picture, only the defect region is generated, so that a remaining part is completely free of distortion. In addition, computation processes can be reduced during encoding and decoding of the generator. For example, compared with a whole image, only an image of a quite small defect region needs to be generated.

In some embodiments, the performing adversarial training on the generative adversarial network includes: separately labeling the real image and the generative image having the specific feature that is generated by the generator, and providing the images together with a corresponding semantic segmentation image to the global discriminator for training; and cutting, based on the semantic segmentation image, a local real image and a local generative image that have a specific feature part respectively from the labeled real image provided to the global discriminator and the generative image having the specific feature hat is generated by the generator, and providing, to the local discriminator for training, the local real image and the local generative image together with a local semantic segmentation image having the specific feature part that is cut from the semantic segmentation image. A local image is cut from a global image for use by the local discriminator, without increasing a burden of additional training sample data. Likewise, the semantic segmentation image only needs to be cut correspondingly without additional preparation.

In some embodiments, data used for training the discriminator includes: a training data pair that includes a labeled real image having the specific feature and a corresponding real semantic segmentation image, a training data pair that includes a labeled real image not having the specific feature and a semantic segmentation image selected from the real semantic segmentation image, and a training data pair that includes a labeled real image not having the specific feature and a randomly generated semantic segmentation image. In this manner, a same discriminator algorithm and program can be applied to a picture not having a defect and a picture having the defect, and a burden of a requirement for a number of training samples is also reduced.

In some embodiments, the performing adversarial training on the generative adversarial network includes: training the global discriminator and the local discriminator in parallel. By integrating global and local discrimination results, the discriminator has a stronger discrimination ability than a conventional discriminator, so that a generation effect of the generator is further improved. Particularly, a local image generation ability with respect to a defect location is significantly improved.

In some embodiments, the specific feature is a welding defect of a sealing pin. The system for training a sample generation model in the present application is used to train a model for generating a sealing pin welding defective sample, thereby effectively solving a problem that a number of real defective samples is small.

According to a fourth aspect, the present application provides a system for generating an image sample having a specific feature. The system includes: an image acquisition module configured to obtain a real image not having a specific feature; a semantic segmentation image construction module configured to construct a semantic segmentation image that indicates a location of a region in which the specific feature is expected to be generated, where the semantic segmentation image is a binary image for distinguishing the specific feature from another object; an image erasing module configured to erase information, in the real image not having the specific feature, that corresponds to the region having the specific feature in the constructed semantic segmentation image; and a sample generation module configured to input an image obtained after erasing the information, together with the semantic segmentation image, to a sample generation model trained according to a model training method provided in the present application, to obtain an image sample having the specific feature. Through this system, a defect can be generated, according to a requirement, at a specified location in a real image not having the defect, to form an image having the defect as a sealing pin welding defective sample, so that a large number of image samples available for training can be conveniently obtained.

In some embodiments, the constructing a semantic segmentation image that indicates a location of a region in which the specific feature is expected to be generated includes: selecting one semantic segmentation image from a plurality of real semantic segmentation images corresponding to a plurality of real images having the specific feature; or specifying one or more expected locations for the specific feature on a plurality of real images not having the specific feature, and generating a corresponding semantic segmentation image based on the specified one or more expected locations for the specific feature. A semantic segmentation image of a real defective image is directly used, or an expected location of a defect is directly specified, for example, a location on a sealing pin weld bead is specified, so that a generated image sample having the defect can be closer to a real defective image.

In some embodiments, the specific feature is a welding defect of a sealing pin. The system for generating an image sample having a specific feature in the present application is used to generate a sealing pin welding region image having a defect, thereby effectively solving a problem that a number of real sealing pin welding defective samples is small.

According to a fifth aspect, a system for generating an image sample having a specific feature is provided. The system includes: a storage unit configured to store a real image not having a specific feature, a sample generation model trained by using a model training method provided in the present application, and a generated image sample having the specific feature; and a computing unit configured to: construct a semantic segmentation image that indicates a location of a region in which the specific feature is expected to be generated, where the semantic segmentation image is a binary image for distinguishing the specific feature from another object; read the real image not having the specific feature from the storage unit; erase information, in the real image not having the specific feature, that corresponds to the region having the specific feature in the constructed semantic segmentation image; and use an image obtained after erasing the information, together with the semantic segmentation image, as an input to the sample generation model, to obtain an image sample having the specific feature.

Through the system for generating an image sample having a specific feature in the present application, a problem that a number of real samples having the specific feature is small can be effectively solved, and an approximately real training image sample is generated by using the trained sample generation model.

The above description is only an overview of the technical solutions of the present application. In order to more clearly understand the technical means of the present application to implement same according to the contents of the specification, and in order to make the above and other objects, features, and advantages of the present application more obvious and understandable, specific embodiments of the present application are exemplarily described below.

BRIEF DESCRIPTION OF THE DRAWINGS

In order to illustrate the technical solutions of the embodiments of the present application more clearly, the drawings required in the description of the embodiments of the present application will be described briefly below. Obviously, the drawings described below are merely some embodiments of the present application, and for those of ordinary skill in the art, other drawings can also be obtained from these drawings without any creative efforts.

In the accompanying drawings, the figures are not drawn to scale.

DETAILED DESCRIPTION OF EMBODIMENTS

Embodiments of the technical solutions of the present application will be described in more detail below with reference to the accompanying drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "including" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the technical features modified thereby. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: the three instances of A alone, A and B simultaneously, and B alone. In addition, the character "/" herein generally indicates an "or" relationship between the associated objects.

Sealing pin welding is an essential link in a production process of traction batteries. Whether the sealing pin welding meets the standard directly affects the safety of the batteries. A sealing pin welding region is referred to as a weld bead. Due to a change in a temperature, an environment, or the like during welding, defects such as a pinhole, a burst point, a burst line (pseudo soldering), missing welding, and a melted bead usually occur on the weld bead. Whether the weld bead has a defect can be automatically detected based on visual AI. Weld bead locating is the first step of defect detection. Therefore, it is quite necessary to develop a precise weld bead locating algorithm.

To train this type of image recognition model, a large number of images not having a defect and images having the defect are required as positive and negative samples respectively for training. However, due to an existing manufacturing process and production quality control, a probability of defects in product manufacturing is quite low. Therefore, real defective samples account only for a quite small part of total production, increasing difficulty of model training. In addition, it is also time-consuming to collect a sufficient number of real defective samples.

In view of the above, to solve a problem that a number of training samples, especially a number of negative samples, is quite small, the present application provides a sample increase method. More specifically, a generative adversarial network may be constructed and trained to obtain a sample generation model capable of generating a generative image having a defect based on an input real image not having the defect. By using this model, a number of negative samples can be effectively increased, and a training time for an image recognition model and a preparation time for system go-live can be shortened.

It may be understood that the present application may be widely applied to the field of quality detection combined with artificial intelligence. A sample generation method and system disclosed in the embodiments of the present application may be but is not limited to being used to generate a sealing pin welding defective sample for a traction battery, and may be further used to generate a defective sample for any other type of product in modern industrial manufacturing or generate any image sample having a specific feature.

In the following embodiments, for the convenience of description, generating a sealing pin welding defective sample for a traction battery is taken as an example for description.

Figure 1:
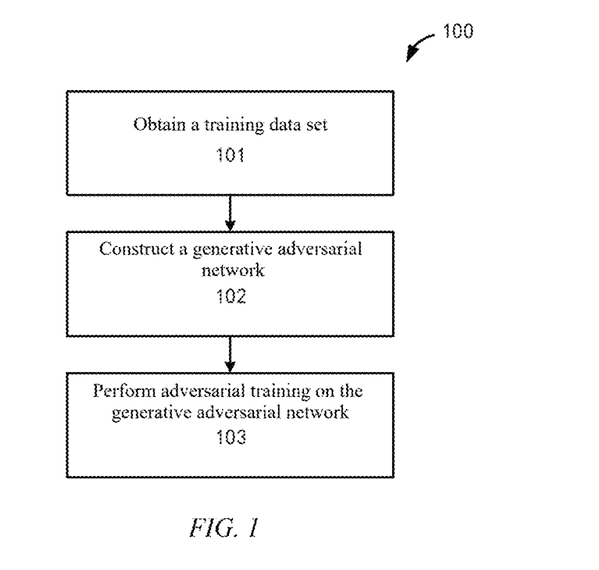
FIG. 1 is an example flowchart of a method for training a sample generation model for generating an image sample having a specific feature according to an embodiment of the present application.

According to an embodiment of the present application, FIG. 1 is an example flowchart of a method 100 for training a sample generation model for generating an image sample having a specific feature according to an embodiment of the present application. As shown in FIG. 1, the method 100 starts at step 101 in which a training data set is obtained. The training data set includes a plurality of real images having a specific feature, a corresponding semantic segmentation image, and a plurality of real images not having the specific feature. The semantic segmentation image is a binary image for distinguishing the specific feature from another object. In step 102, a generative adversarial network is constructed. A generator of the generative adversarial network is configured to generate a generative image having the specific feature based on the input semantic segmentation image and a corresponding real image not having the specific feature, where the semantic segmentation image is used as a priori information about a location of the specific feature. A discriminator of the generative adversarial network further includes a global discriminator and a local discriminator, where the global discriminator is configured to discriminate authenticity of an input image, and the local discriminator is configured to discriminate authenticity of an input local image having the specific feature. In step 103, adversarial training is performed on the generative adversarial network to optimize an ability of the generator to generate a generative image having the specific feature based on a real image not having the specific feature. The trained generator is used as the sample generation model.

Figure 2:
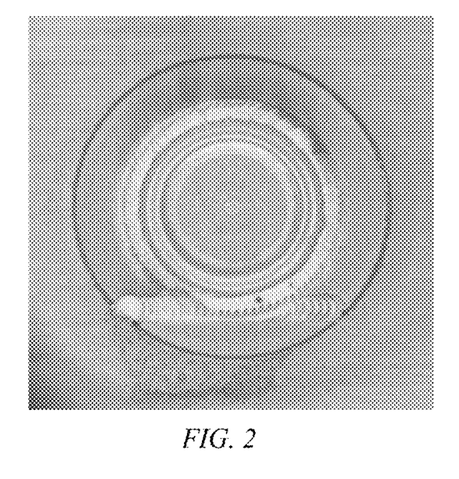
FIG. 2 is an example of a real image sample not having a specific feature according to an embodiment of the present application.

The real image is a real image captured by an image capturing device (for example, a camera). For example, in this example, the real image may be a photo of a sealing pin welding region, as shown in FIG. 2. The specific feature refers to an object that is included in an image and that has a specific feature, for example, the sky, the sea, a cat, or a dog. In this example, the specific feature may be a defect in the sealing pin welding region.

Figure 3:
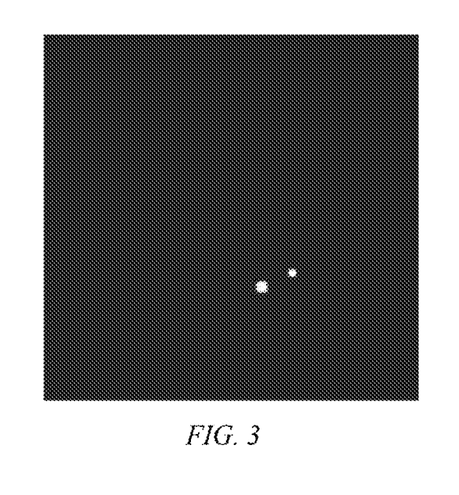
FIG. 3 is an example semantic segmentation image corresponding to the real image sample in FIG. 2.

FIG. 3 is a semantic segmentation image corresponding to the real image in FIG. 2. The semantic segmentation image is also referred to as a mask image. In this example, the semantic segmentation image identifies only the specific feature in the image, namely, the defect in the sealing pin welding region. Therefore, in FIG. 3, a white region represents a defect part, and a remaining part represents a non-defect part. Therefore, the semantic segmentation image provides information about whether the specific feature exists in the image and a specific location of the specific feature.

The generative adversarial network is an existing unsupervised machine learning model in the prior art. A typical generative adversarial network includes a generative network and a discriminative network, which are also referred to as a generator and a discriminator. In a generative adversarial network model used to generate an image, a generator is trained to generate an expected picture, and a discriminator is trained to determine whether an input picture is a real picture or a picture generated by the generator. If a discrimination success rate of the discriminator is quite high, it indicates that current generation fidelity of the generator is quite low, and therefore a generative algorithm of the generator needs to be optimized. Otherwise, if a discrimination success rate of the discriminator is quite low, it indicates that a current discriminative algorithm of the discriminator needs to be optimized. As the discriminator continuously optimizes its discriminative algorithm and the generator continuously optimizes its generative algorithm, the discriminator and the generator finally reach a balance. In this case, a discrimination success rate of the discriminator is close to 50%, that is, the discriminator cannot discriminate authenticity of a picture, in other words, a picture generated by the generator is infinitely close to a real picture.

In this example, an objective is to obtain, through training, a model capable of generating a generative image having a defect based on an input real image not having the defect and a semantic segmentation image (indicating a defect location). Therefore, the generator continuously generates a generative image having a defect by using a real image not having the defect and a corresponding semantic segmentation image, for the discriminator to perform discrimination. In a generation process, a defective image is used as a priori information indicating a defect location, so that the defect in the generative image is generated at a defect location indicated in the semantic segmentation image.

Different from the prior art, the discriminator in the present application further includes a global discriminator and a local discriminator. The global discriminator has a same operating principle as that of a discriminator in the prior art, and is configured to discriminate authenticity of a complete input image. The local discriminator is configured to discriminate authenticity of an image that has a defect part and that is cut from the complete input image. A discriminative algorithm of the local discriminator may be the same as that of the global discriminator, and the local discriminator and the global discriminator may use a convolutional neural network CNN with a same structure.

As mentioned above, an overall training process for the generative adversarial network is a process of "adversarial" training of the generator and the discriminator, until the generator and the discriminator reach a balance. In this example, the adversarial training is similar to a common training process for the generative adversarial network, except that a discrimination result provided by an original discriminator is currently obtained by integrating respective discrimination results of the global discriminator and the local discriminator. A final training result is that neither the global discriminator nor the local discriminator can distinguish authenticity of an image having the defect that is generated by the generator. Therefore, the trained generator may be used to generate a defective image at a specified location based on a real image not having the defect, so as to obtain a generative image having the defect. The generator may also be used as a sample generation model for generating an image sample having the sealing pin welding defect.

Through this method for training a sample generation model provided in the present application, an image sample generation model capable of generating a specific feature at a specified location in a real image can be obtained through training. Compared with a conventional generative adversarial network, the sample generation model in the present application introduces information about a location of a specific feature as a priori information. This can effectively reduce an amount of computation during training of the generator and the discriminator of the generative adversarial network, and improve a discrimination accuracy rate and generation fidelity. In addition, an additional local discriminator is added, so that a generated feature can remain realistic in local zoom-in, and details of the generated feature can be better restored.

According to some embodiments of the present application, optionally, the generator uses a SPADE-based generator structure, and the generator is configured to: use, as an input, data that includes the semantic segmentation image and an image obtained after erasing, from a corresponding real image, information about a specific feature region indicated in the semantic segmentation image, where the image obtained after erasing the information is input to a backbone network of an encoder-decoder structure, and the semantic segmentation image is input, as a semantic mask, to a SPADE branch to be introduced into a decoder part of the backbone network. The backbone network uses the image obtained after erasing the information as random noise to generate a feature map of the specific feature region indicated in the semantic segmentation image, performs blending, based on the semantic segmentation image, on the generated feature map and the image obtained after erasing the information, and uses a blended image as the generated generative image having the specific feature.

Figure 4:
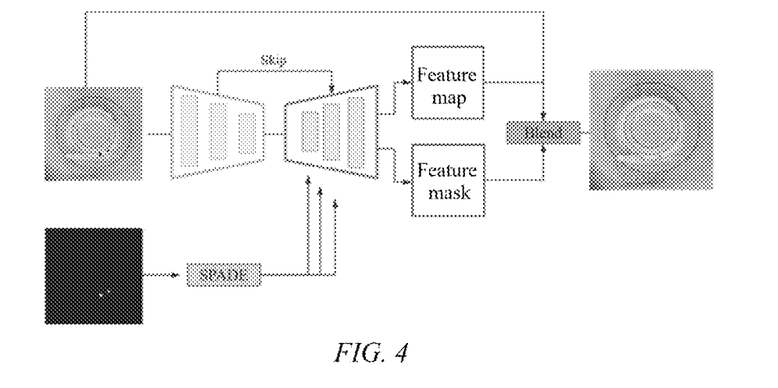
FIG. 4 is an example structural diagram of a generator according to an embodiment of the present application.

FIG. 4 is an example structural diagram of a generator according to an embodiment of the present application. As shown in FIG. 4, a backbone network of the generator uses a common encoder-decoder structure. An input to the encoder is an image obtained after information about a specific feature region indicated in a semantic segmentation image is erased from an original image. In this example, the original image is a sealing pin welding region, and the semantic segmentation image is a mask image indicating a location of a welding defect. Therefore, the image input to the encoder is an image obtained after a welding defect region indicated in the mask image is erased. In an optional example, a skip link may be added between the generator and the encoder.

SPADE is an existing algorithm in the field of image generation, and can obtain a variety of composed images when a semantic segmentation image is given. A typical application is to learn a style of a reference image and transform a style of an input image based on a semantic segmentation image, for example, change a landscape photo into an oil painting style. In this example, the SPADE (Spatially-Adaptive Normalization) algorithm is introduced into a decoding part of the generator as a branch network of the generator, to assist the decoder in completing a normalization operation. The semantic segmentation image indicating the defect location is provided to the SPADE as an input, and the defect location is also introduced into a generation model as a priori information.

An output of the encoder is a generative image obtained after a region is erased, that is, a generated defective image. Blending is performed on the generative image and the input image of the generator (that is, the image obtained after the defect region is erased) based on the location indicated in the mask image, to obtain a generated sealing pin welding image having the defect.

By using this SPADE-based generator structure, the generator can generate an image of a defect at a specified location in the semantic segmentation image based on a feature of an input real image of a sealing pin region. The generated defect appears to have a feature of a surrounding region, and blending with the surrounding region is quite natural and realistic. In addition, in a final output picture, only the defect region is generated, so that a remaining part is completely free of distortion. In addition, computation processes can be reduced during encoding and decoding of the generator. For example, compared with a whole image, only an image of a quite small defect region needs to be generated.

According to some embodiments of the present application, optionally, the performing adversarial training on the generative adversarial network includes: separately labeling the real image and the generative image having the specific feature that is generated by the generator, and providing the images together with a corresponding semantic segmentation image to the global discriminator for training; and cutting, based on the semantic segmentation image, a local real image and a local generative image that have a specific feature part respectively from the labeled real image provided to the global discriminator and the generative image having the specific feature hat is generated by the generator, and providing, to the local discriminator for training, the local real image and the local generative image together with a local semantic segmentation image having the specific feature part that is cut from the semantic segmentation image.

Figure 5:
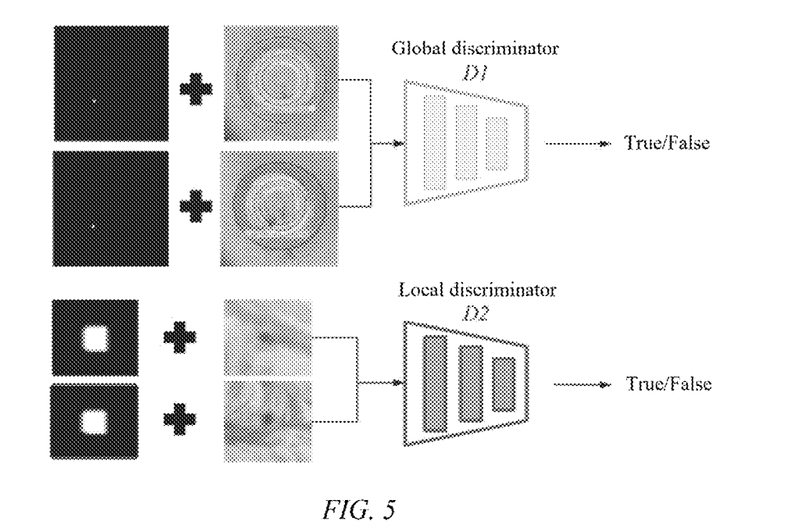
FIG. 5 is an example structural diagram of a discriminator according to an embodiment of the present application.

FIG. 5 is an example structural diagram of a discriminator according to an embodiment of the present application. As mentioned above, the local discriminator and the global discriminator in the present application may be based on a same neural network structure, and a difference lies only in that the local discriminator performs discriminative training by using a local image cut from a whole image (hereinafter referred to as a "global image"). Alternatively, the local discriminator may be trained by using a local image sample set different from a training sample set used for the global discriminator. During training of the global discriminator, a labeled global image and a corresponding semantic segmentation image may be used to perform training. A real picture, regardless of a real picture having a defect or a real image not having a defect, may be labeled as "true", and a generative picture may be labeled as "false", to verify discrimination accuracy of the discriminator. Similarly, during training of the local discriminator, a local image and a local semantic segmentation image that have a defect part, for example, a rectangular local image having a defect part, may be cut from a global image and a semantic segmentation image, and labeling may still be used. In a discrimination process of the discriminator, a semantic segmentation image corresponding to an image may be used as a priori indication indicating a defect location, that is, the discriminator knows the defect location, and may discriminate authenticity by focusing on analysis of data at the defect location.

A local image is cut from a global image for use by the local discriminator, without increasing a burden of additional training sample data. Likewise, the semantic segmentation image only needs to be cut correspondingly without additional preparation.

According to some embodiments of the present application, optionally, data used for training the discriminator includes: a training data pair that includes a labeled real image having the specific feature and a corresponding real semantic segmentation image, a training data pair that includes a labeled real image not having the specific feature and a semantic segmentation image selected from the real semantic segmentation image, and a training data pair that includes a labeled real image not having the specific feature and a randomly generated semantic segmentation image.

The training data for the discriminator is used to enable the discriminator to learn of a feature of a real picture and a feature of a generative picture, so as to distinguish between the two pictures. A real semantic segmentation image corresponding to a real picture not having a defect should be empty. However, this does not meet a training requirement, because the discriminator needs to be notified of specific locations on which discrimination is to be focused, and specific parts that are to be cut and provided to the local discriminator, similar to a case of a picture having a defect. Therefore, in a training process, a real picture not having a defect may be paired with a semantic segmentation image of a real picture having the defect, or may be paired with a randomly generated semantic segmentation image. Optionally, a real picture not having a defect may be alternatively paired with semantic segmentation images of a plurality of different real pictures having the defect and a randomly generated semantic segmentation image to form a plurality of sets of training data. This reduces a number of real pictures not having a defect that need to be used as training samples.

In this manner, a same discriminator algorithm and program can be applied to a picture not having a defect and a picture having the defect, and a burden of a requirement for a number of training samples is also reduced.

According to some embodiments of the present application, optionally, the performing adversarial training on the generative adversarial network includes: training the global discriminator and the local discriminator in parallel.

As mentioned above, the local discriminator may perform discriminative training by using a local image and a local semantic segmentation image that are cut from a global image and a semantic segmentation image that are used by the global discriminator. Therefore, global training data and local training data are respectively provided to the two discriminators, so that the two discriminators can be trained in parallel, thereby further reducing an overall time spent in a discriminator training process.

According to some embodiments of the present application, optionally, the performing adversarial training on the generative adversarial network includes: comprehensively evaluating a generation effect of the generator in combination with discrimination results of the global discriminator and the local discriminator, and optimizing a parameter of the generator based on a comprehensive evaluation result of the discriminators.

As mentioned above, the discrimination results of the global discriminator and the local discriminator may be integrated as a discrimination result. For example, the result is "true" or "false" only when the discrimination results of the two discriminators are the same, for example, when both discrimination results are "true" (that is, a real image) or both discrimination results are "false" (that is, a generative image); and the result is "false" when the discrimination results of the two discriminators are different. The result is then compared with a label of input training data to verify a discrimination accuracy rate of the discriminator. The discrimination accuracy rate of the discriminator being closer to 50% indicates a better generation effect of the generator. Similar to a conventional generative adversarial network that uses only one discriminator, the results of the discriminator may be fed back to the generator for parameter optimization, to improve the generation effect of the generator.

By integrating global and local discrimination results, the discriminator has a stronger discrimination ability than a conventional discriminator, so that a generation effect of the generator is further improved. Particularly, a local image generation ability with respect to a defect location is significantly improved.

According to some embodiments of the present application, optionally, the specific feature is a welding defect of a sealing pin.

As mentioned above, the method for training a sample generation model in the present application may be used to train a model for generating a sealing pin welding defective sample, thereby effectively solving a problem that a number of real defective samples is small.

Figure 6:
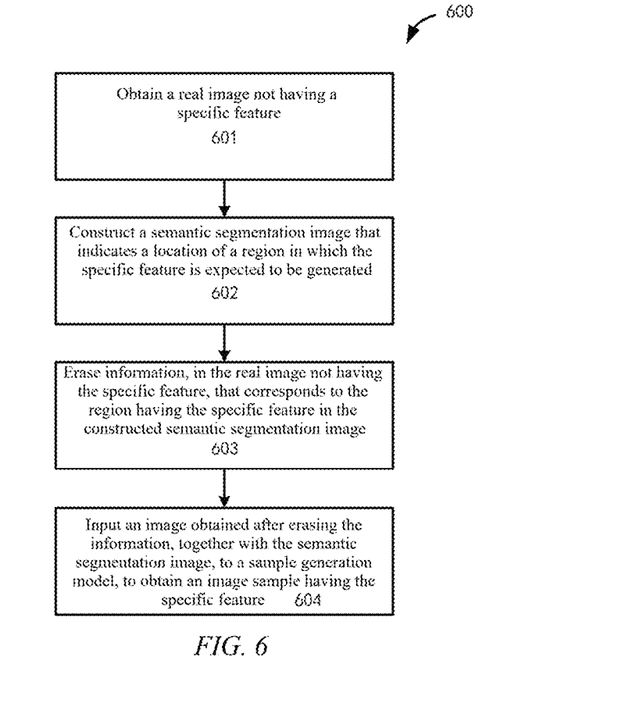
FIG. 6 is an example flowchart of a method for generating an image sample having a specific feature according to an embodiment of the present application.

According to another embodiment of the present application, FIG. 6 is an example flowchart of a method 600 for generating an image sample having a specific feature according to an embodiment of the present application. As shown in FIG. 6, the method 600 starts at step 601 in which a real image not having a specific feature is obtained. In step 602, a semantic segmentation image that indicates a location of a region in which the specific feature is expected to be generated is constructed, where the semantic segmentation image is a binary image for distinguishing the specific feature from another object. In step 603, information, in the real image not having the specific feature, that corresponds to the region having the specific feature in the constructed semantic segmentation image is erased. In step 604, an image obtained after erasing the information is input, together with the semantic segmentation image, to a sample generation model trained according to a method for training a sample generation model in the present application, to obtain an image sample having the specific feature.

A real image may be obtained by using an image capturing device, for example, obtained through photographing by using a camera. For each obtained real image, a location at which the specific feature is expected to be generated may be determined. In an example of an image of a sealing pin welding region, a location at which a defect is expected to be generated, for example, a specific location on a weld bead, may be determined. Each image may have more than one defect location, that is, may have a plurality of defect locations. The location may be manually specified, or may be randomly specified on the weld bead after a location of the weld bead in the image is obtained through image recognition and analysis. After the location is determined, a binary semantic segmentation image is constructed correspondingly. For example, the defect is labeled, and a non-defect part is not labeled. Then content at a corresponding location in the real image is erased based on the location indicated in the constructed semantic segmentation image. An image obtained after the erasing is paired with the semantic segmentation image as an input to the sample generation model. The sample generation model is the aforementioned model that is trained to generate, based on a semantic segmentation image and an image obtained after erasing content at a corresponding location, an image having a specific feature at a corresponding location. Therefore, an image sample having a defect at a specified location in the input real image is obtained as an output of the model.

Through this method, a defect can be generated, according to a requirement, at a specified location in a real image not having the defect, to form an image having the defect as a sealing pin welding defective sample, so that a large number of image samples available for training can be conveniently obtained.

According to some embodiments of the present application, optionally, the constructing a semantic segmentation image that indicates a location of a region in which the specific feature is expected to be generated includes: selecting one semantic segmentation image from a plurality of real semantic segmentation images corresponding to a plurality of real images having the specific feature; or specifying one or more expected locations for the specific feature on a plurality of real images not having the specific feature, and generating a corresponding semantic segmentation image based on the specified one or more expected locations for the specific feature.

A semantic segmentation image of a real defective image is directly used, or an expected location of a defect is directly specified, for example, a location on a sealing pin weld bead is specified, so that a generated image sample having the defect can be closer to a real defective image.

According to some embodiments of the present application, optionally, the specific feature is a welding defect of a sealing pin.

As mentioned above, the method for generating an image sample having a specific feature in the present application may be used to generate a sealing pin welding region image having a defect, thereby effectively solving a problem that a number of real sealing pin welding defective samples is small.

Figure 7:
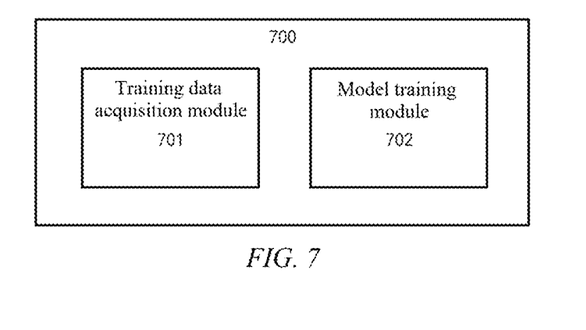
FIG. 7 is an example structural diagram of a system for training a sample generation model for generating an image sample having a specific feature according to an embodiment of the present invention.

According to still another embodiment of the present application, referring to FIG. 7, the present application provides a system 700 for training a sample generation model for generating an image sample having a specific feature. As shown in FIG. 7, the system 700 includes: a training data acquisition module 701 and a model training module 702. The training data acquisition module 701 is configured to obtain a training data set, where the training data set includes a plurality of real images having a specific feature, a corresponding semantic segmentation image, and a plurality of real images not having the specific feature, and the semantic segmentation image is a binary image for distinguishing the specific feature from another object. The model training module 702 is configured to construct a generative adversarial network, where a generator of the generative adversarial network is configured to generate a generative image having the specific feature based on the input semantic segmentation image and a corresponding real image not having the specific feature, where the semantic segmentation image is used as a priori information about a location of the specific feature. A discriminator of the generative adversarial network further includes a global discriminator and a local discriminator. The global discriminator is configured to discriminate authenticity of an input image, and the local discriminator is configured to discriminate authenticity of an input local image having the specific feature. The model training module 702 is further configured to perform adversarial training on the generative adversarial network to optimize an ability of the generator to generate a generative image having the specific feature based on a real image not having the specific feature. The trained generator is used as the sample generation model.

According to some embodiments of the present application, optionally, the generator uses a SPADE-based generator structure, and the generator is configured to: use, as an input, data that includes the semantic segmentation image and an image obtained after erasing, from a corresponding real image, information about a specific feature region indicated in the semantic segmentation image, where the image obtained after erasing the information is input to a backbone network of an encoder-decoder structure, and the semantic segmentation image is input, as a semantic mask, to a SPADE branch to be introduced into a decoder part of the backbone network. The backbone network uses the image obtained after erasing the information as random noise to generate a feature map of the specific feature region indicated in the semantic segmentation image, performs blending, based on the semantic segmentation image, on the generated feature map and the image obtained after erasing the information, and uses a blended image as the generated generative image having the specific feature.

According to some embodiments of the present application, optionally, the performing adversarial training on the generative adversarial network includes: separately labeling the real image and the generative image having the specific feature that is generated by the generator, and providing the images together with a corresponding semantic segmentation image to the global discriminator for training; and cutting, based on the semantic segmentation image, a local real image and a local generative image that have a specific feature part respectively from the labeled real image provided to the global discriminator and the generative image having the specific feature hat is generated by the generator, and providing, to the local discriminator for training, the local real image and the local generative image together with a local semantic segmentation image having the specific feature part that is cut from the semantic segmentation image.

According to some embodiments of the present application, optionally, data used for training the discriminator includes: a training data pair that includes a labeled real image having the specific feature and a corresponding real semantic segmentation image; a training data pair that includes a labeled real image not having the specific feature and a semantic segmentation image selected from the real semantic segmentation image; and a training data pair that includes a labeled real image not having the specific feature and a randomly generated semantic segmentation image.

According to some embodiments of the present application, optionally, the performing adversarial training on the generative adversarial network includes: training the global discriminator and the local discriminator in parallel.

According to some embodiments of the present application, optionally, the performing adversarial training on the generative adversarial network includes: comprehensively evaluating a generation effect of the generator in combination with discrimination results of the global discriminator and the local discriminator, and optimizing a parameter of the generator based on a comprehensive evaluation result of the discriminators.

According to some embodiments of the present application, optionally, the specific feature is a welding defect of a sealing pin.

Through the system for training a sample generation model for generating an image sample having a specific feature in the present application, an image sample generation model capable of generating a specific feature at a specified location in a real image can be obtained through training, so that a large number of training samples required can be quickly generated. This model training system is configured to perform the model training method in the present application, and therefore also correspondingly has the technical effects of the embodiments of the model training method. For brevity, details are not described herein again.

Figure 8:
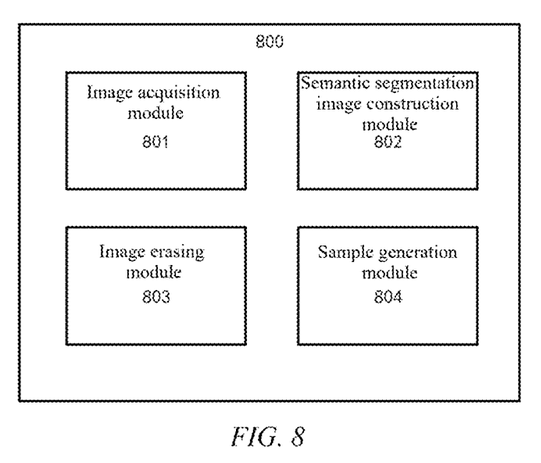
FIG. 8 is an example structural diagram of a system for generating an image sample having a specific feature according to an embodiment of the present invention.

According to yet another embodiment of the present application, referring to FIG. 8, the present application provides a system 800 for generating an image sample having a specific feature. As shown in FIG. 8, the system 800 includes: an image acquisition module 801, the image acquisition module 801 being configured to obtain a real image not having a specific feature; a semantic segmentation image construction module 802, the semantic segmentation image construction module 802 being configured to construct a semantic segmentation image that indicates a location of a region in which the specific feature is expected to be generated, where the semantic segmentation image is a binary image for distinguishing the specific feature from another object; an image erasing module 803, the image erasing module 803 being configured to erase information, in the real image not having the specific feature, that corresponds to the region having the specific feature in the constructed semantic segmentation image; and a sample generation module 804, the sample generation module 804 being configured to input an image obtained after erasing the information, together with the semantic segmentation image, to a sample generation model trained according to a model training method provided in the present application, to obtain an image sample having the specific feature.

According to some embodiments of the present application, optionally, the constructing a semantic segmentation image that indicates a location of a region in which the specific feature is expected to be generated includes: selecting one semantic segmentation image from a plurality of real semantic segmentation images corresponding to a plurality of real images, of welding of a sealing pin, that have the specific feature; or specifying one or more expected locations for the specific feature on a plurality of real images not having the specific feature, and generating a corresponding semantic segmentation image based on the specified one or more expected locations for the specific feature.

According to some embodiments of the present application, optionally, the specific feature is a welding defect of a sealing pin.

Corresponding to the sample generation method in the present application, the system for generating an image sample having a specific feature in the present application may be used to generate a sealing pin welding region image having a defect, thereby effectively solving a problem that a number of real sealing pin welding defective samples is small.

Figure 9:
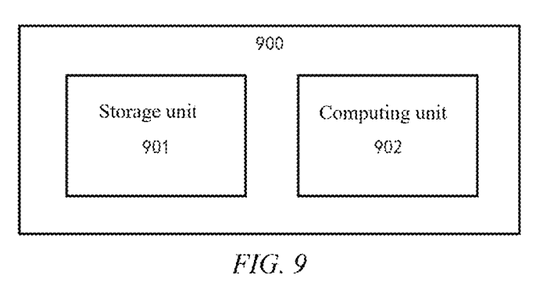
FIG. 9 is an example structural diagram of a system for generating an image sample having a specific feature according to an embodiment of the present invention.

According to still yet another embodiment of the present application, referring to FIG. 9, a system 900 for generating an image sample having a specific feature is provided. As shown in FIG. 9, the system 900 includes: a storage unit 901 configured to store a real image not having a specific feature, a sample generation model trained by using a model training method provided in the present application, and a generated image sample having the specific feature; and a computing unit 902, the computing unit 902 being configured to: construct a semantic segmentation image that indicates a location of a region in which the specific feature is expected to be generated, where the semantic segmentation image is a binary image for distinguishing the specific feature from another object; read the real image not having the specific feature from the storage unit 901; erase information, in the real image not having the specific feature, that corresponds to the region having the specific feature in the constructed semantic segmentation image; and use an image obtained after erasing the information, together with the semantic segmentation image, as an input to the sample generation model, to obtain an image sample having the specific feature.

The storage unit 901 may include a RAM, a ROM, or a combination thereof. In some cases, the storage unit 901 may include, in particular, a basic input/output system (BIOS) that may control basic hardware or software operations, such as interaction with peripheral components or devices. The stored real image may be an image sample obtained by using an image capturing device.

The computing unit 902 may include an intelligent hardware device (for example, a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof).

The various illustrative blocks and modules described in connection with the disclosure herein can be implemented or performed with a general-purpose processor, a DSP, an ASIC, an FPGA, or another programmable logic device, discrete gate, or transistor logic, a discrete hardware component, or any combination thereof, that is designed to perform functions described herein. The general-purpose processor may be a microprocessor, but in an alternative, the processor may be any conventional processor, controller, microcontroller, or state machine. The processor may be alternatively implemented as a combination of computing devices (for example, a combination of a DSP and a microprocessor, a plurality of microprocessors, one or more microprocessors in conjunction with a DSP core, or any other such configurations). The functions described herein may be implemented in hardware, software executed by a processor, firmware, or any combination thereof. If implemented in software executed by a processor, the functions may be stored on or transmitted over a computer-readable medium as one or more instructions or codes. Other examples and implementations are within the scope of the present disclosure and the appended claims. For example, due to the nature of software, the functions described herein may be implemented by using software executed by a processor, hardware, firmware, hardwiring, or any combination thereof. Features implementing the functions may also be physically located at various locations, including being distributed such that portions of the functions are implemented at different physical locations.

Through the system for generating an image sample having a specific feature in the present application, a problem that a number of real samples having the specific feature is small can be effectively solved, and an approximately real training image sample is generated by using the trained sample generation model. This system may be used to generate an image sample having a defect of a sealing pin welding region, and may also be widely applied to various scenarios in which a large number of image samples having a specific feature need to be generated.

While the present application has been described with reference to the preferred embodiments, various modifications can be made, and equivalents can be provided to substitute for the components thereof without departing from the scope of the present application. In particular, the technical features mentioned in the embodiments can be combined in any manner, provided that there is no structural conflict. The present application is not limited to the specific embodiments disclosed herein but includes all the technical solutions that fall within the scope of the claims.

The invention claimed is:

1. A method for training a sample generation model for generating an image sample having a specific feature, wherein the method comprises:
   obtaining a training data set, wherein the training data set comprises a plurality of real images having a specific feature, a corresponding semantic segmentation image, and a plurality of real images not having the specific feature, and the semantic segmentation image is a binary image for distinguishing the specific feature from another object;
   constructing a generative adversarial network, wherein
      a generator of the generative adversarial network is configured to generate a generative image having the specific feature based on the input semantic segmentation image and a corresponding real image not having the specific feature, wherein the semantic segmentation image is used as a priori information about a location of the specific feature; and a discriminator of the generative adversarial network further comprises a global discriminator and a local discriminator, wherein the global discriminator is configured to discriminate authenticity of an input image, and the local discriminator is configured to discriminate authenticity of an input local image having the specific feature; and performing adversarial training on the generative adversarial network to optimize an ability of the generator to generate a generative image having the specific feature based on a real image not having the specific feature, wherein the trained generator is used as the sample generation model.

2. The method of claim 1, wherein the generator uses a SPADE-based generator structure, and the generator is configured to:

use, as an input, data that comprises the semantic segmentation image and an image obtained after erasing, from a corresponding real image, information about a specific feature region indicated in the semantic segmentation image, wherein the image obtained after erasing the information is input to a backbone network of an encoder-decoder structure, and the semantic segmentation image is input, as a semantic mask, to a SPADE branch to be introduced into a decoder part of the backbone network, wherein the backbone network uses the image obtained after erasing the information as random noise to generate a feature map of the specific feature region indicated in the semantic segmentation image; and performs blending, based on the semantic segmentation image, on the generated feature map and the image obtained after erasing the information, and uses a blended image as the generated generative image having the specific feature.

3. The method of claim 1, wherein the performing adversarial training on the generative adversarial network comprises:

separately labeling the real image and the generative image having the specific feature that is generated by the generator, and providing the images together with a corresponding semantic segmentation image to the global discriminator for training; and cutting, based on the semantic segmentation image, a local real image and a local generative image that have a specific feature part respectively from the labeled real image provided to the global discriminator and the generative image having the specific feature hat is generated by the generator, and providing, to the local discriminator for training, the local real image and the local generative image together with a local semantic segmentation image having the specific feature part that is cut from the semantic segmentation image.

4. The method of claim 1, wherein data used for training the discriminator comprises:

a training data pair that comprises a labeled real image having the specific feature and a corresponding real semantic segmentation image;

a training data pair that comprises a labeled real image not having the specific feature and a semantic segmentation image selected from the real semantic segmentation image; and a training data pair that comprises a labeled real image not having the specific feature and a randomly generated semantic segmentation image.

5. The method of claim 1, wherein the performing adversarial training on the generative adversarial network comprises: training the global discriminator and the local discriminator in parallel.

6. The method of claim 1, wherein the performing adversarial training on the generative adversarial network comprises:

comprehensively evaluating a generation effect of the generator in combination with discrimination results of the global discriminator and the local discriminator, and optimizing a parameter of the generator based on a comprehensive evaluation result of the discriminators.

7. The method of claim 1, wherein the specific feature is a welding defect of a sealing pin.

8. A method for generating an image sample having a specific feature, wherein the method comprises:

obtaining a real image not having a specific feature;

constructing a semantic segmentation image that indicates a location of a region in which the specific feature is expected to be generated, wherein the semantic segmentation image is a binary image for distinguishing the specific feature from another object;

erasing information, in the real image not having the specific feature, that corresponds to the region having the specific feature in the constructed semantic segmentation image; and inputting an image obtained after erasing the information, together with the semantic segmentation image, to a sample generation model trained by using a method according to claim 1, to obtain an image sample having the specific feature.

9. The method of claim 8, wherein the constructing a semantic segmentation image that indicates a location of a region in which the specific feature is expected to be generated comprises:

selecting one semantic segmentation image from a plurality of real semantic segmentation images corresponding to a plurality of real images having the specific feature; or specifying one or more expected locations for the specific feature on a plurality of real images not having the specific feature, and generating a corresponding semantic segmentation image based on the specified one or more expected locations for the specific feature.

10. The method of claim 8, wherein the specific feature is a welding defect of a sealing pin.

11. A system for generating an image sample having a specific feature, wherein the system comprises:

a storage unit configured to store a real image not having a specific feature, a sample generation model trained by using a method according to claim 1, and a generated image sample having the specific feature; and a computing unit configured to:

construct a semantic segmentation image that indicates a location of a region in which the specific feature is expected to be generated, wherein the semantic segmentation image is a binary image for distinguishing the specific feature from another object;

read the real image not having the specific feature from the storage unit;

erase information, in the real image not having the specific feature, that corresponds to the region having the specific feature in the constructed semantic segmentation image; and use an image obtained after erasing the information, together with the semantic segmentation image, as an input to the sample generation model, to obtain an image sample having the specific feature.

12. The system of claim 11, wherein the constructing a semantic segmentation image that indicates a location of a region in which the specific feature is expected to be generated comprises:

selecting one semantic segmentation image from a plurality of real semantic segmentation images corresponding to a plurality of real images, of welding of a sealing pin, that have the specific feature; or specifying one or more expected locations for the specific feature on a plurality of real images not having the specific feature, and generating a corresponding semantic segmentation image based on the specified one or more expected locations for the specific feature.

13. The system of claim 11, wherein the specific feature is a welding defect of the sealing pin.

* * * * *